United States Patent [19]

Klingelhofer

[11] Patent Number: 6,026,218
[45] Date of Patent: Feb. 15, 2000

[54] COMPUTER SYSTEM EMPLOYING A BUS SNOOPING MULTIMEDIA SUBSYSTEM FOR IMPLEMENTING VIDEO MULTICAST TRANSACTIONS

[75] Inventor: Marc E. Klingelhofer, Redwood City, Calif.

[73] Assignee: Sun Microsystems, Inc., Mountain View, Calif.

[21] Appl. No.: 08/872,869

[22] Filed: Jun. 11, 1997

[51] Int. Cl.[7] .............................. G06F 13/00; G06F 13/22
[52] U.S. Cl. ........................ 395/287; 395/289; 395/856; 395/866; 395/306
[58] Field of Search ..................................... 395/287, 289, 395/285, 286, 866, 856, 822–25, 855, 306; 710/107, 109, 105, 106, 46, 35, 1–5, 126, 11, 15, 18, 21

[56] References Cited

U.S. PATENT DOCUMENTS

| | | | |
|---|---|---|---|
| 4,446,515 | 5/1984 | Sauer et al. | 395/200.82 |
| 4,718,037 | 1/1988 | Thaden | 395/800.37 |
| 4,817,080 | 3/1989 | Soha | 370/83 |
| 5,570,126 | 10/1996 | Blahut et al. | 348/7 |
| 5,586,251 | 12/1996 | Coleman et al. | 395/183.19 |
| 5,682,484 | 10/1997 | Lambrecht | 395/308 |
| 5,754,525 | 5/1998 | Lo et al. | 370/94.1 |
| 5,764,895 | 6/1998 | Chung | 395/200.8 |

FOREIGN PATENT DOCUMENTS

| | | |
|---|---|---|
| 0825536A | 2/1998 | European Pat. Off. . |
| 9624901A | 8/1996 | WIPO . |

OTHER PUBLICATIONS

IBM Technical Disclosure, "Snoop Mechanism to Monitor Computer Bus," vol. 32, No. 11, Apr. 1990, pp. 170–171.
Patent Abstracts of Japan for Japanese Patent No. 06 096016A vol. 18, No. 365, (P–1767), Jul. 8, 1994.
Patent Abstracts of Japan for Japanese Patent No. 09 251439A vol. 98, No. 1, Jan. 30, 1998.
International Search Report for PCT/US98/12373 dated Oct. 21, 1998.

*Primary Examiner*—Ayaz R. Sheikh
*Assistant Examiner*—Ario Etienne
*Attorney, Agent, or Firm*—Conley, Rose & Tayon, PC; B. Noel Kivlin

[57] ABSTRACT

A bus snooping multimedia subsystem for implementing video multicast transactions. A multimedia data source such as a video input digitizer is coupled to an expansion bus of a computer system. A plurality of multimedia destination subsystems are further coupled to the expansion bus, such as a video accelerator card and a video compression device, among others. At least one of the destination subsystems is configured to implement a snooping mode of operation wherein transactions effectuated upon the expansion bus are monitored. The snooping destination subsystem may include a programmable storage unit to allow the device to be programmed with specified addresses (or address ranges). The programmed address information associated with the storage unit may correspond to addresses mapped to another destination subsystem in the computer system. If a transaction is initiated upon the expansion bus which involves the transfer of data having an address corresponding to the information within the programmable storage unit, the snooping destination subsystem latches in the data concurrently with the other destination subsystem by monitoring the associated bus signals. The snooping destination subsystem may then process the data in accordance with the functionality of the device, as desired. For example, in one implementation, the snooping destination device is a video compression device which compresses data at the same time it is being received and displayed by a video controller to which the data is targeted.

18 Claims, 4 Drawing Sheets

COMPUTER SYSTEM EMPLOYING A BUS SNOOPING MULTIMEDIA SUBSYSTEM FOR IMPLEMENTING VIDEO MULTICAST TRANSACTIONS

BACKGROUND OF THE INVENTION

1. Field of the Invention

This invention relates to computer systems and, more particularly, to communication protocols and mechanisms for transferring video data in high performance multimedia computer systems.

2. Description of the Related Art

Computer architectures generally include a plurality of devices interconnected by one or more buses. For example, conventional computer systems typically include a CPU coupled through bridge logic to a main memory. The bridge logic also typically couples to a high bandwidth local expansion bus, such as the Peripheral Component Interconnect (PCI) bus or the VESA (Video Electronics Standards Association) VL bus. Modern local bus standards such as the PCI bus and the VL bus are not constrained by a requirement to be backwards compatible with prior expansion bus adapters, and thus may provide much higher throughput than older expansion buses. Examples of devices which can be coupled to local expansion buses include video accelerators, video compressors and decompressors, audio cards, SCSI adapters, telephony cards, and network interface cards, among many others. An older-style expansion bus may also be coupled to the local expansion bus to provide compatibility with earlier-version expansion bus adapters. Examples of such earlier expansion buses include the industry standard architecture (ISA) bus, also referred to as the AT bus, the extended industry standard architecture (EISA) bus, and the microchannel architecture (MCA) bus. Various devices may be coupled to this second expansion bus, including a fax/modem, sound card, etc.

Computer systems were originally developed for business applications including word processing and spreadsheet applications, among others. Recently, computer systems have increasingly been employed in the processing of multimedia applications including a variety of video and audio applications such as compression and decompression, video capture and playback, telephony, and speech recognition. To support high performance within such multimedia systems, data must not only be provided to (and processed by) the main CPU extremely fast, but also must typically be conveyed quickly to various other subsystems which support the multimedia functionality. Due in part to the limited bandwidth of the expansion bus, in some situations real time devices can become "starved" for data, particularly when a relatively large number of real time devices are included within the system. This can correspondingly result in degraded performance, unsynchronized audio and video, and the dropping of frames during video or animation sequences. It is thus important to utilize the available bandwidth of the expansion bus efficiently.

In some situations, a particular piece of data may need to be conveyed to more than a single device residing on the expansion bus. For example, it may be desirable to provide video data from a video input digitizer to a frame buffer for displaying a real time video sequence and to also transfer the data to a video compressor to allow subsequent conveyance of compressed video data to other components of the system. While the establishment of improved local expansion bus standards such as the PCI bus standard has allowed higher throughput, most bus transfer protocols only allow for a single data source device and a single data destination device to be specified during a particular bus transaction. Accordingly, separate bus cycles must typically be effectuated upon the expansion bus to complete the desired transfers. The effectuation of separate bus cycles on the expansion bus consumes valuable bandwidth and can limit the overall performance of the system.

Therefore, an improved system and method are desirable which allow multimedia data including video data to be quickly transferred to more than a single destination device at a time to thereby attain more efficient usage of the available bandwidth of the expansion bus and accommodate higher performance multimedia computer systems.

SUMMARY OF THE INVENTION

The problems outlined above are in large part solved by a computer system employing a bus snooping multimedia subsystem for implementing video multicast transactions in accordance with the present invention. In one embodiment, a multimedia data source such as a video input digitizer is coupled to an expansion bus of a computer system. A plurality of multimedia destination subsystems are further coupled to the expansion bus, such as a video accelerator card and a video compression device, among others. At least one of the destination subsystems is configured to implement a snooping mode of operation wherein transactions effectuated upon the expansion bus are monitored. The snooping destination subsystem may include a programmable storage unit to allow the device to be programmed with specified addresses (or address ranges). The programmed address information associated with the storage unit may correspond to addresses mapped to another destination subsystem in the computer system. If a transaction is initiated upon the expansion bus which involves the transfer of data having an address corresponding to the information within the programmable storage unit, the snooping destination subsystem receives the data concurrently with the other destination subsystem by monitoring the associated bus signals and determining when valid data is present. The snooping destination subsystem may then process the data in accordance with the functionality of the device, as desired. For example, in one implementation, the snooping destination device is a video compression device which compresses data at the same time it is being received and displayed by a video controller to which the data is targeted.

A system employing the snooping destination subsystem may advantageously accommodate efficient utilization of the bandwidth of an expansion bus by allowing the multicasting of data when it must be processed by more than a single device. Separate bus transactions upon the expansion bus are unnecessary. Furthermore, since the snooping destination subsystem is programmed to monitor the bus signals to determine occurrences of valid data to be received, and does not actively assert any signals upon the bus, the protocol associated with the expansion bus need not be changed. Accordingly, the expansion bus will remain compatible with other industry-standard expansion devices.

BRIEF DESCRIPTION OF THE DRAWINGS

Other objects and advantages of the invention will become apparent upon reading the following detailed description and upon reference to the accompanying drawings in which.

Figure 1:
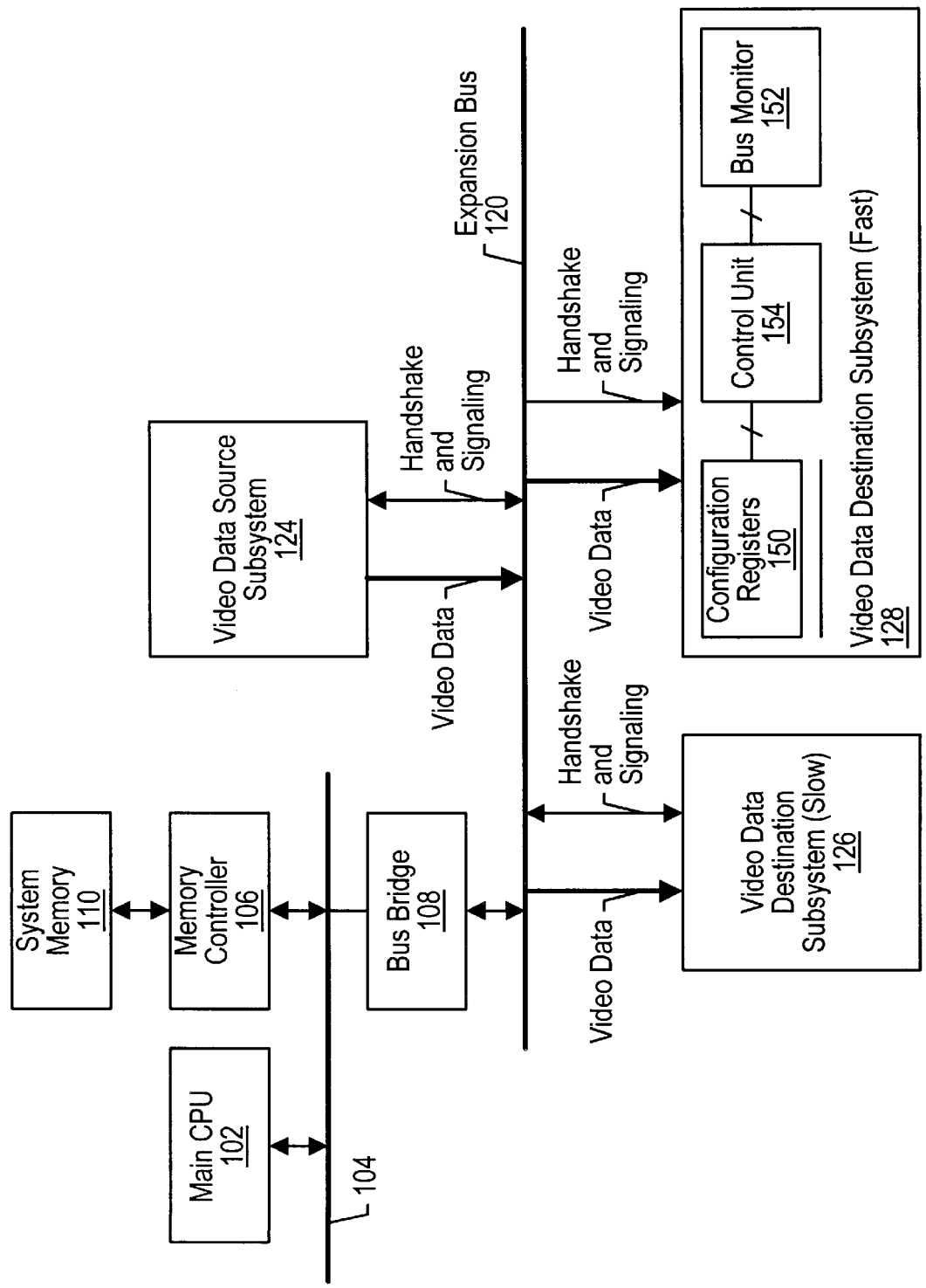
FIG. 1 is a block diagram of a computer system employing a bus snooping multimedia subsystem for implementing video multicast transactions.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a computer system employing a bus snooping multimedia subsystem for implementing video multicast transactions in accordance with one embodiment of the present invention. As illustrated, the computer system includes a main CPU (central processing unit) 102 coupled through a CPU local bus 104 to a memory controller 106 and a bus bridge 108. A system memory 110 interfaces to CPU local bus 104 through memory controller 106. A cache memory subsystem (not shown) may further be coupled to main CPU 102.

Bus bridge 108 provides an interface to an expansion bus 120. In one embodiment, expansion bus 120 is implemented in accordance with the PCI (Peripheral Component Interconnect) bus standard. It is noted, however, that various other expansion buses could alternatively be employed, such as the VESA (Video Electronics Standards Association) VL bus.

Main CPU 102 is illustrative of for example, a SPARC™ microprocessor or an x86 microprocessor. It is understood, however, that a system according to the present invention may employ other types of microprocessors. It is further understood that the present invention may be employed within a multiprocessing environment.

Various types of devices may be connected to the expansion bus 120. As generally shown in the figure, a source subsystem 124 as well as a pair of destination subsystems 126 and 128 are shown coupled to expansion bus 120. Source subsystem 124 is illustrative of a variety of multimedia systems, such as a video input digitizer or a CD ROM device. Similarly, destination subsystems 126 and 128 are illustrative of a variety of multimedia subsystems, such as video accelerator cards, video compression and decompression systems, and so on. It is noted that in other embodiments, source subsystem 124 and destination subsystems 126 and 128 may process audio data. A variety of additional subsystems (not shown) may further be coupled to expansion bus 120. For example, a composite disk array, a network interface card, and a modem may be coupled to expansion bus 120, as desired. A bus arbiter (not shown) may further be provided to control ownership of expansion bus 120.

As will be described in further detail below, destination subsystem 128 is a bus snooping multimedia subsystem whereby the device may be programmed to snoop transactions effectuated upon expansion bus 120 and to selectively receive data as it is being passed between other devices coupled to the expansion bus. Thus, destination subsystem 128 may advantageously be programmed to detect occurrences of data transmissions from video data source subsystem 124 to video data destination subsystem 126 if a transfer of the same data to both devices is desired. Following this programming and depending upon the addresses of data being conveyed upon the bus, data may be concurrently received by destination subsystem 128 in accordance with the programmed information. In this manner, multimedia data may be conveyed in a multicast fashion using single bus transactions without modifying the various protocols associated with expansion bus 120. Accordingly, efficient usage of the bus bandwidth of expansion bus 120 may be attained while retaining compatibility with industry standard expansion bus devices. Further details regarding specific operations associated with the system of FIG. 1 will next be considered.

Figure 2:
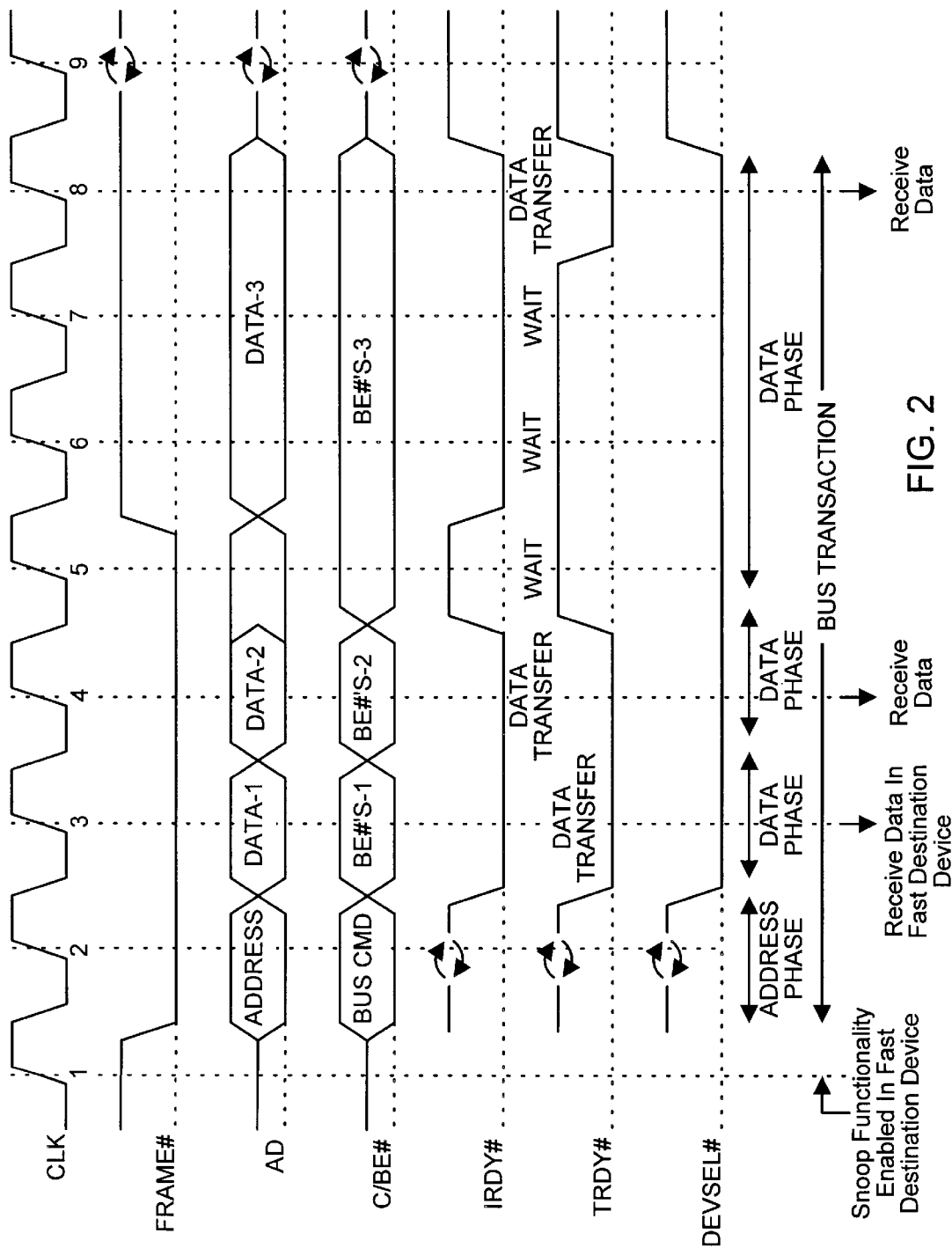
FIG. 2 is a timing diagram that illustrates an exemplary set of PCI control signals which may be generated during a data transfer transaction wherein data is received by the bus snooping multimedia subsystem.
Figure 3:
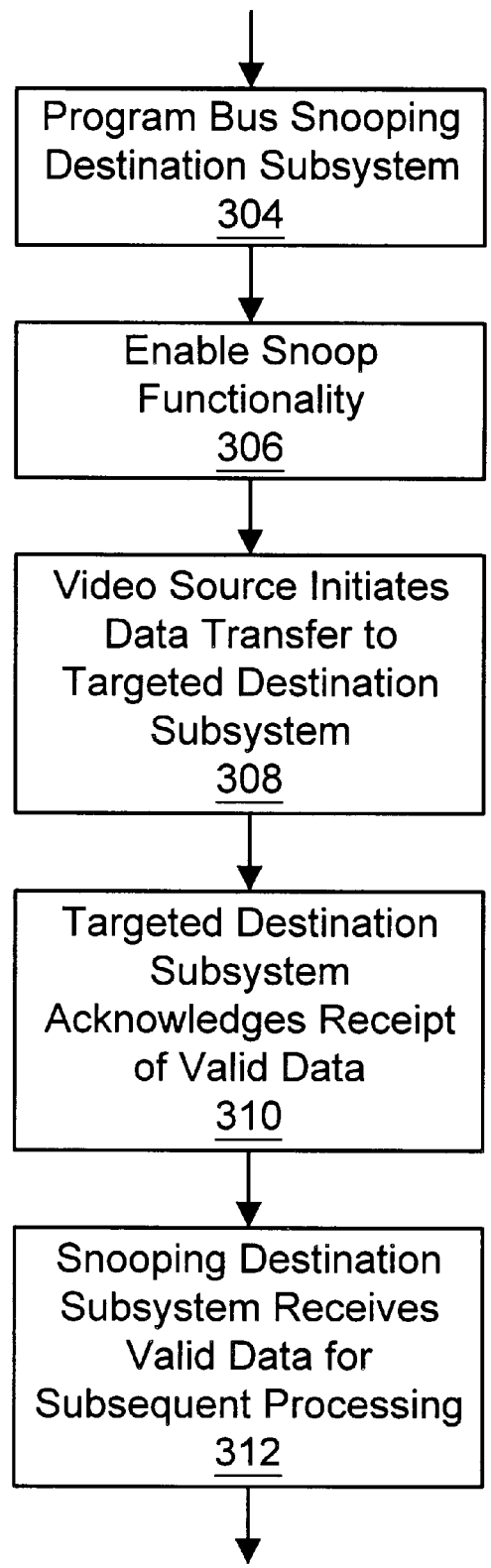
FIG. 3 is a generalized flow diagram illustrating various steps associated with the programming of the bus snooping multimedia subsystem and its associated snooping functionality.

FIG. 2 is a timing diagram illustrating an exemplary transfer of data from source subsystem 124 to destination subsystem 126. FIG. 2 additionally illustrates various functionality associated with the snooping operation of destination subsystem 128. Finally, FIG. 3 is a generalized flow diagram illustrating various aspects of the snooping functionality of destination subsystem 128. In the following discussion, reference will be made collectively to FIGS. 1–3.

The bus snooping functionality of destination subsystem 128 may be invoked through a software command associated with, for example, an application program executing upon main CPU 102. For this purpose, in the embodiment of FIG. 1, destination subsystem 128 includes a configuration registers unit 150 which is programmed in accordance with a command with address information which specifies the addresses or range of addresses for which multicast transmissions are desired. Additional information may further be programmed within configuration registers unit 150, such as information regarding the manner in which the multicast data should be processed by destination subsystem 128 after receipt. The initial programming of the destination subsystem 128 and enabling of the snoop functionality are illustrated by steps 304 and 306 of FIG. 3.

It is noted that the addresses associated with data received by destination subsystem 128 in accordance with its snooping functionality are mapped to other devices in the system, such as to video data destination subsystem 126. The destination subsystem 128 may also be configured to support normal communications associated with addresses for which it is mapped.

It is further noted that the snooping functionality associated with destination subsystem 128 must accommodate the data transfer rate associated with the snooped transactions for which data is to be received. Accordingly, typically the destination subsystem 128 must be faster (or at least as fast as) the destination subsystem to which the associated data transactions are targeted.

Destination subsystem 128 includes a bus monitor 152 which monitors transactions being effectuated upon expansion bus 120 when the snooping functionality of destination subsystem 128 is enabled. A control unit 154 is finally illustrated which controls the snooping functionality of the device as well as other bus interfacing functionality which may be associated with normal bus transactions supported by destination subsystem 128.

After the destination subsystem 128 is programmed as described above, a bus transaction may be initiated (step 308) which corresponds to the programmed address information within configuration registers unit 150. FIG. 2 illustrates an exemplary set of PCI control signals associated with such a transaction which involves a transfer of data from source subsystem 124 to destination subsystem 126. The address signal conveyed upon the multiplexed address/data lines AD during the first illustrated clock cycle maps to a location associated with destination subsystem 126. Accordingly, destination subsystem 126 asserts the device select signal DEVSEL# to claim the cycle. During various subsequent data phases, data is transferred from source subsystem 124 to destination subsystem 126 in a conventional manner. Valid data is conveyed and acknowledged in accordance with assertions of the initiator ready signal IRDY# and target ready signal TRDY# (step 310). If the destination device 126 is not ready to receive data at a particular time, the target ready signal TRDY# is deasserted by the device and various idle states may be invoked, as shown.

In accordance with the programmed information in configuration register unit 150, bus monitor 152 in conjunction with control unit 154 detect the transaction being effectuated upon expansion bus 120. Specifically, occurrence of the transaction is detected during the address phase when the address is conveyed upon the AD lines and the device select signal is asserted low by the target device (i.e. destination subsystem 126). In response to the programmed information and detection of the bus transaction, destination subsystem 128 receives the data being conveyed in subsequent clock cycles until it detects deassertion of either the iniatiator ready signal IRDY# or the target ready signal TRDY# (step 312). It is noted that the last data phase of a bus transaction is indicated by assertion of the frame signal FRAME#. It is further noted that when burst transfers are being effectuated, control unit 154 is configured to internally track the addresses associated with any data phases beyond the first, and to correspondingly receive or ignore the associated data being conveyed upon the bus depending upon the programmed address information within configuration registers unit 150.

Figure 4:
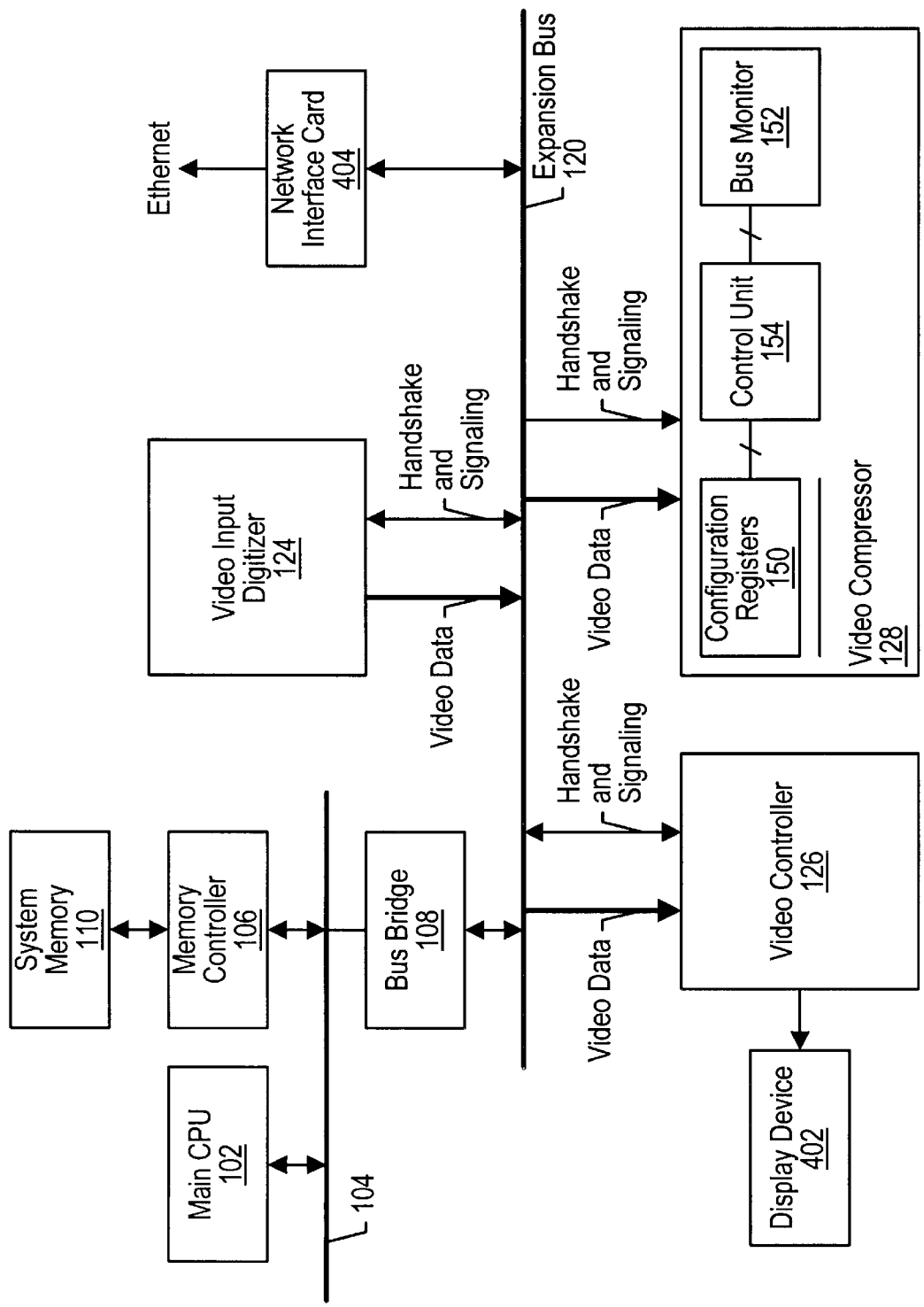
FIG. 4 is another embodiment of a computer system.

Turning next to FIG. 4, another embodiment of a computer system is shown. Various subsystems within the computer system of FIG. 4 are similar to those of FIG. 1, and are numbered identically for simplicity and clarity.

The destination subsystem 126 of FIG. 4 is a video controller which processes video information for display upon a display device 402, and destination subsystem 128 is a video compressor configured to compress video data in accordance with, for example, the MPEG (Motion Picture Experts Group) II standard. The video data source subsystem 124 is a video input digitizer. The system of FIG. 4 further includes a network interface card 404 coupled to expansion bus 120 which provides an Ethernet connection.

In accordance with the previous discussion, destination subsystem 128 may be programmed to snoop transactions effectuated upon expansion bus 120 and to selectively receive data in a multicast fashion as it is being transferred from source subsystem 124 to destination subsystem 126. Accordingly, the video compressor 128 may advantageously receive and compress video data at the same time it is being processed and displayed by video controller 126 and video display 402. Following compression, the compressed video data may be transmitted to other devices coupled to the Ethernet, for example.

It is noted that in another configuration, video controller 126 may be coupled to CPU local bus 104 rather than expansion bus 120. In such a configuration, video compressor 128 may snoop data transactions involving video controller 126 in a manner as described above.

A computer system including a bus snooping destination subsystem as described above may advantageously allow efficient utilization of the available bandwidth of an expansion bus to thereby accommodate high performance. Furthermore, protocols associated with the expansion bus need not be modified, thus allowing compatibility with industry standard expansion bus devices.

Numerous variations and modifications will become apparent to those skilled in the art once the above disclosure is fully appreciated. It is intended that the following claims be interpreted to embrace all such variations and modifications.

What is claimed is:

1. A computer system comprising:

a source subsystem coupled to a bus;

a first destination subsystem coupled to said bus, wherein said first destination subsystem is configured to receive data transferred across said bus from said source subsystem in response to an occurrence of a predetermined bus cycle, wherein said source subsystem is configured to convey during said predetermined bus cycle an address value mapped to said first destination subsystem upon said bus, and wherein said first destination subsystem asserts a response signal upon said bus to respond to said predetermined bus cycle according to a designated bus protocol, and wherein said response signal is received by said source subsystem; and a multimedia destination subsystem coupled to said bus for performing a predetermined multimedia function, wherein said multimedia destination subsystem is configured to snoop transactions occurring upon said bus and to selectively receive said data transferred across said bus upon detecting said predetermined bus cycle and said address value, wherein said multimedia destination subsystem receives said data during said predetermined bus cycle without actively asserting any signal upon said bus.

2. The computer system as recited in claim 1 wherein said multimedia destination subsystem is configured to be programmed with a command to cause said multimedia destination subsystem to monitor said bus to determine whether said predetermined bus cycle is being effectuated to transfer said data from said source subsystem to said first destination subsystem.

3. The computer system as recited in claim 2 wherein said multimedia destination subsystem includes a programmable storage coupled to said bus for storing said command.

4. The computer system as recited in claim 2 wherein said command includes address information indicating designated data to be received by said multimedia destination subsystem.

5. The computer system as recited in claim 4 wherein said multimedia destination subsystem further includes a control unit configured to track burst addresses associated with burst transactions effectuated upon said bus and to determine whether said designated data associated with said burst transactions correspond to said address information.

6. The computer subsystem as recited in claim 3 wherein said multimedia destination subsystem further includes a bus monitor coupled to said bus and configured to detect said occurrence of said predetermined bus cycle in accordance with said command stored in said programmable storage.

7. The computer system as recited in claim 6 wherein said multimedia destination subsystem further includes a control unit coupled to said programmable storage and said bus monitor, wherein said control unit is configured to cause said multimedia destination subsystem to accept said data being transferred from said source subsystem to said first destination subsystem during said predetermined bus cycle.

8. The computer system as recited in claim 7 wherein said bus monitor is configured to snoop transactions effectuated upon said bus to thereby determine when said data is being transferred during said predetermined bus cycle.

9. The computer system as recited in claim 2 wherein said source subsystem is a digital video source.

10. The computer system as recited in claim 9 wherein said multimedia destination subsystem is a video compressor.

11. The computer system as recited in claim 10 wherein said video compressor compresses said data in accordance with control information contained in said command after accepting said data during said predetermined bus cycle.

12. The computer system as recited in claim 1 wherein said predetermined bus cycle is a write cycle.

13. The computer system as recited in claim 12 wherein said write cycle is initiated by said source subsystem, and wherein said source subsystem conveys said address value upon said bus.

14. The computer system as recited in claim 1 wherein said predetermined bus cycle is a read cycle.

15. A method for multicasting video data in a computer system including a source subsystem, a first destination subsystem, and a multimedia destination subsystem coupled to a bus, said method comprising:

programming said multimedia destination subsystem to snoop said bus to determine whether a predetermined bus cycle is being effectuated;

conveying an address value mapped to said first destination subsystem during said predetermined bus cycle;

said first destination subsystem asserting a response signal upon said bus to respond to said predetermined bus cycle according to a designated bus protocol;

said source subsystem receiving said response signal;

transferring said data across said bus from said source subsystem to said first destination subsystem; and said multimedia destination subsystem detecting said address value and said predetermined bus cycle in response to said programming and selectively receiving said data being transferred across said bus during said predetermined bus cycle without actively asserting any signal upon said bus.

16. The method as recited in claim 15 wherein said source subsystem is a digital video source.

17. The method as recited in claim 16 wherein said multimedia destination subsystem is a video compressor, and wherein said video compressor is configured to process said data.

18. The method as recited in claim 15 wherein said predetermined bus cycle is a write cycle.

* * * * *